July 21, 1936.  C. D. SMITH  2,048,357
CANTING DEVICE
Filed Dec. 19, 1932
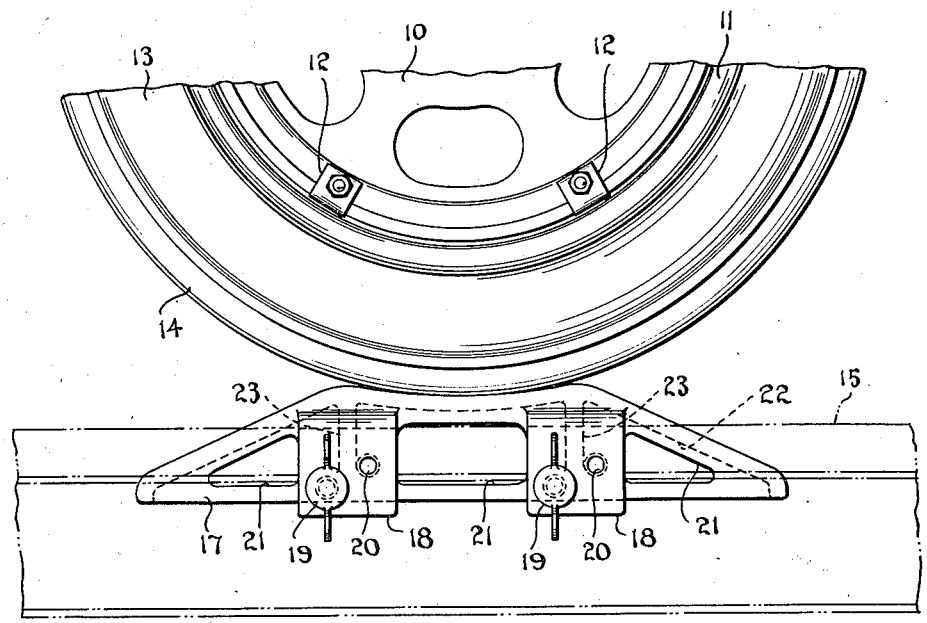
Fig.1
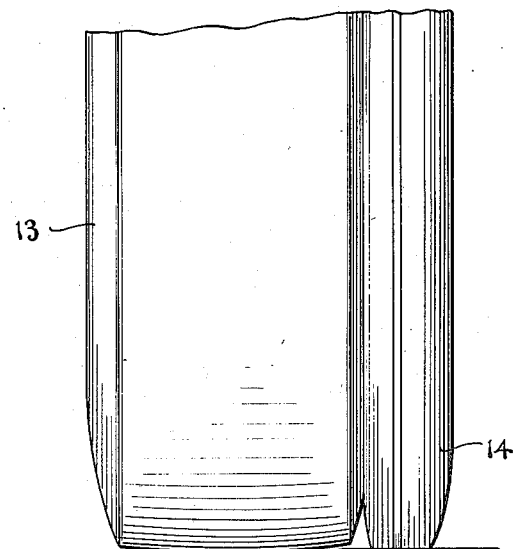
Fig.2
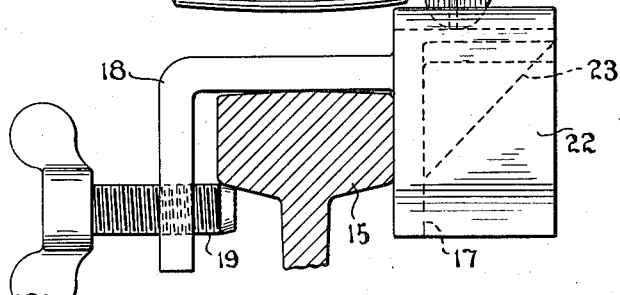
INVENTOR
Clifford D. Smith
ATTORNEYS Patented July 21, 1936

2,048,357

UNITED STATES PATENT OFFICE 2,048,357

CANTING DEVICE

Clifford D. Smith, Fairlawn, Ohio, assignor to The Firestone Tire & Rubber Company, Akron, Ohio, a corporation of Ohio Application December 19, 1932, Serial No. 647,929

4 Claims. (Cl. 254—88)

This invention relates to canting devices, and more especially it relates to devices for canting a wheeled vehicle or an axle thereof for the purpose of removing a tire from a wheel of the vehicle.

The invention is of primary utility for the canting of rail cars, that is, vehicles equipped with rubber tires adapted for travel upon track rails such as street car or railway tracks, the wheels of such cars being provided, on their inner sides, with flanges which extend beyond the outer perimeters of the tires to prevent the latter from leaving the rails.

The chief objects of the invention are to provide simple and efficient means for raising the tire of a rail car off a track rail for the purpose of removing the tire from the wheel; to provide for ease and facility of operation; and to provide a device by which the power plant of the vehicle may be utilized for raising a tire thereof off the track. Other objects will be manifest.

Of the accompanying drawing:

Figure 1 is a fragmentary front elevation of a vehicle wheel with a rubber tire thereon, and the improved canting device in operative association therewith in the raising of the tire off a track rail; and Figure 2 is a side elevation thereof as viewed from the right of Figure 1.

Referring to the drawing, 10 is a vehicle wheel, 11 is a demountable tire rim secured thereon by clips 12, 12, and 13 is a pneumatic tire mounted upon the rim 11. A flange 14 is secured to the rear side of the wheel 10 and is disposed laterally of the tire 13 and extends radially beyond the perimeter thereof for the purpose of engaging the inner side of a track rail 15 to prevent the vehicle from leaving the rails. The arrangement is such that the rim 11 with the tire 12 thereon may be removed from the wheel 10 without disturbing the flange 14. It will be understood that the tire 13 may be a solid rubber tire or a hollow cushion tire instead of the pneumatic tire shown.

The improved canting device for raising the tire 13 off the rail 15 consists of a unitary metal structure comprising a side plate 17 formed with a pair of spaced apart, L-shaped bracket arms 18, 18 extending laterally from one side thereof, said bracket arms being adapted to rest upon the top of a track rail 15 so that the plate 17 is positioned in abutting relation to the inner face of the head of the rail. Respective thumb screws 19, 19 are threaded through the bracket arms 18, said screws having their ends tapered somewhat so as to engage the under side of the rail head for the purpose of clamping the canting device to the rail. The bracket arms 18 may be formed with one or more threaded apertures 20 for receiving the thumb screws 19 in alternative positions whereby they may engage rail heads of different thicknesses. The plate 17 may be recessed as at 21, 21 to reduce its weight.

The upper marginal portion of the plate 17 on the opposite side thereof from the bracket arms 18, is formed with a relatively wide integral flange 22. The top of said flange is concave or dished in its medial region and downwardly sloped at each end thereof. Suitable webs 23, 23 may be provided for reinforcing the flange 22. The device is so constructed that when it is mounted upon a rail head the concave medial portion of the flange 22 is disposed substantially above the top of the rail and the sloping end portions of the flange extend below the rail head as shown.

In operation, the canting device is clamped to the inner side of a track rail as shown. The vehicle is then moved onto the device, the flange 14 engaging one of the sloping end portions of the flange 22 and moving upwardly thereon until it rests in the concave medial portion of said flange when the vehicle stops moving. With the flange 14 thus positioned, the tire 13 is in an elevated position, clear of the track rail 15, and may be removed from the wheel if desired.

The device may be conveniently carried by the vehicle so as to be immediately available for use, and it achieves the several advantages set out in the foregoing statement of objects.

Modification may be resorted to without departing from the spirit of the invention or the scope of the appended claims, which are not limited wholly to the specific construction shown and described.

What is claimed is:

1. A canting device adapted to cooperate with a track rail for raising therefrom a vehicle wheel including a removable tire and a fixed flange, said device comprising a pair of oppositely inclined planes and an intermediate concave raised portion, and means for mounting said device on the inside of the track rail, in the path of the wheel flange, with the concave portion thereof above the top of the rail to support the fixed flange in an elevated position for raising the tire off the rail in order that the tire may be changed.

2. A canting device comprising a concave medial portion and contiguous, oppositely sloped portions at the respective ends thereof, a plurality of bracket arms formed thereon and adapted to rest upon a track rail, to support the concave portion of the device above the top of the track rail and laterally thereof, and means carried by said arms for clamping the device to said rail.

3. A canting device consisting of a unitary metal structure comprising a plate, a laterally extending flange along the upper margin thereof, said flange being longitudinally concave in its medial portion and downwardly sloped at its respective end portions, laterally projecting bracket arms on the opposite side of the plate adapted to rest upon a track rail and support said flange laterally of the rail, and means at the ends of said arms for clamping the device to the track rail.

4. A canting device adapted to cooperate with a track rail for raising therefrom a vehicle wheel including a removable tire and a fixed flange, said device being positionable on said track rail in the path of the movable wheel and having an inclined guiding surface parallel to the side of said rail in the plane of the lateral flange of the wheel, said device being adapted, by engagement with the wheel flange, to support the fixed flange in an elevated position in its normal plane for raising the tire off the rail by reason of the movement of the wheel along the rail in order that the tire may be changed.

CLIFFORD D. SMITH.